United States Patent Office 2,861,095
Patented Nov. 18, 1958

2,861,095

FLUOROCYCLOHEXENE DERIVATIVES

John J. Drysdale, Clifton Park Manor, Del., assignor to E. I. du Pont de Nemours and Company, Wilmington, Del., a corporation of Delaware No Drawing. Application September 7, 1954
Serial No. 454,607

7 Claims. (Cl. 260—464)

This invention relates to cyclic organic compounds containing fluorine. More particularly, it relates to certain fluorocyclohexenes and to the method for their preparation.

Fluorine-containing unsaturated cyclic compounds are useful in a variety of applications and they are especially useful as chemical intermediates. In such uses, the particular number and position of the fluorine atoms and the number and kind of other substituents in the ring structure are quite important since they influence the type of chemical reactions and products obtainable. The number of known fluorine-containing, unsaturated cyclic compounds is rather limited, especially those having hydrogens on the annular carbons of a cyclohexene nucleus. Consequently, it is of considerable importance to develop new compounds of this type.

This invention has as an object the preparation of new cyclic, unsaturated, fluorinated compounds. Another object is the preparation of new chemical intermediates. A further object is the preparation of new solvents. Other objects will appear hereinafter.

These objects are accomplished by the present invention of fluorocyclohexenes containing an annular $CF_2$ group adjacent to a $CX_2$ group in which the X's are the same or different and are fluorine, chlorine or bromine, and two annular $CH_2$ groups, any substituents on the two remaining annular carbons, i. e., those bearing the double bond, being monovalent hydrocarbon free from aliphatic unsaturation, cyano, or halogen of atomic number not greater than 35, and the process therefor wherein a vinylidenefluorocyclobutane of the formula

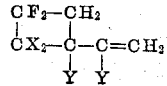

wherein the X's are the same or different and represent fluorine, chlorine or bromine, and the Y's are the same or different and represent hydrogen, halogen of atomic number not greater than 35, cyano or monovalent hydrocarbon groups free from aliphatic unsaturation is pyrolyzed by exposing the same to a temperature of 450–800° C.

The process of this invention is conveniently carried out by passing a vinylidenefluorocyclobutane of the formula shown above through a reaction zone heated to a temperature of from 450° to 800° C. The lower temperatures in the broad operating range give significant conversions of the vinylidenefluorocyclobutanes to the fluorocyclohexenes. However, when the X's in the above formula of the starting cyclobutane are both fluorine, the preferred operating range is 650° to 750° C. since higher conversions to the desired fluorocyclohexenes are obtained. Temperatures above 800° C. are undesirable because of the tendency of the vinylidenefluorocyclobutanes to be converted to difluorobenzenes rather than to the desired cyclohexenes at such temperatures. When one or both of the X's in the general formula are chlorine or bromine, the preferred operating temperatures are 550° to 650° C. Furthermore, the optimum temperature is dependent on the particular Y substituents in the fluorocyclobutane being pyrolyzed. For example, when the Y's in the formula given above are hydrogen, best results are obtained at pyrolysis temperatures of about 750° C. while a temperature of 650° C. is preferred when the Y's in the formula for the fluorocyclobutane are methyl groups.

The pressure at which the pyrolysis of the vinylidenefluorocyclobutanes is carried out is not critical, pressures ranging from a few microns of mercury to atmospheric or even superatmospheric being operable. In general, it is preferred to use the lower pressures, i. e., pressures of less than 50 mm. of mercury, in order to get reaction products out of the reaction zone as rapidly as possible so that formation of undesirable by-products is minimized. In general, it is also desirable to use lower temperatures at the higher pressures.

The rate at which the vinylidenefluorocyclobutane is passed through the reaction zone is not critical, although for economical reasons it is preferred to use a rate as high as possible. It is only necessary to heat the fluorocyclobutane to the reaction temperature for a short time to obtain the desired rearrangement of the cyclobutane to the desired cyclohexene. The rate of gas flow through the reactor is greater at the lower pressures. Consequently, the shortest contact times of reactants in the reaction zone are obtained with the lowest operating pressures.

In the pyrolysis of those vinylidenefluorocyclobutanes which are polymerizable, it is desirable to add a small amount of polymerization inhibitor, e. g., hydroquinone, to the tetrafluorocyclobutane before or during its passage through the reaction zone.

The reactor can be constructed of any inert heat-resistant material. For example, the reactor can be made of quartz, heat-resistant glass, stainless steel, or other inert metal. The reactor can, if desired, be packed with inert materials, for example, granular quartz, to provide better heat transfer. Metals or other materials which react with the fluorocyclobutane under the operating conditions to give undesirable by-products should not be used. The reaction zone can be heated by conventional means. Electric heaters are very satisfactory for this purpose.

The vinylidenefluorocyclobutanes used as starting materials in the process of this invention can be prepared by reacting a 1,1-difluoroethylene with a suitable diene by the process described in U. S. Patent 2,462,347 to P. L. Barrick.

In the large-scale preparation of the fluorinated cyclohexenes of this invention, it is very convenient to carry out the process, including preparation of the vinylidenefluorocyclobutane starting materials, by a continuous vapor phase method at atmospheric pressure. In this embodiment, the 1,1-difluoroethylene, e. g., tetrafluoroethylene, and the diene, e. g., 1,3-butadiene, in equal volumes, or with an excess of the latter, with or without nitrogen as a diluent, are metered into a reaction tube heated by an electric furnace. The reaction tube is conveniently made of the heat-resistant glass known commercially as "Vycor" and is packed with quartz chips to provide better heat transfer. When the reaction tube is maintained at 460–500° C., the conversion of tetrafluoroethylene and butadiene to vinyltetrafluorocyclobutane is from 31% to 60% and the conversion to the tetrafluorocyclohexene is about 1%. However, when the reaction tube is maintained at about 590° C., only about 1% of the tetrafluorocyclobutane is collected, while the conversion to tetrafluorocyclohexene amounts to about 24%. At this higher reaction temperature there is also a conversion to o-difluorobenzene of about 18%, Presumably at this high temperature the tetrafluorocyclobutane first formed cleaves and rearranges to the other products. The formation of tetrafluoroethylene dimer, which occurs to some extent in this process, can be decreased by employing an excess, e. g., a 100% excess, of the diene.

The following examples in which parts are by weight are illustrative of the invention.

In these examples the reactor consists of a heat-resistant glass tube (the type of glass known commercially as "Vycor") 13/16 inch in diameter (inside) and 20.5 inches long packed with 6-mm. sections of quartz tubing 6 mm. in diameter. The packed and heated zone is 12 inches long. The reaction tube is heated externally by means of a cylindrical electric furnace and the temperature is recorded by a thermocouple placed in the center of the reaction tube. A high capacity vacuum pump maintains the reaction system at the desired reduced pressure. The vinylidenefluorocyclobutane reactant is introduced into the reaction zone gradually by conventional means, e. g., by a dropping funnel, and the reaction products are condensed in a trap which is cooled by a coolant capable of condensing by-products at the pressure employed. A suitable coolant when the reaction is conducted at very low pressures is liquid nitrogen. A mixture of acetone and solid carbon dioxide is suitable when the reaction is conducted at higher pressures.

*Example I*

One hundred parts of 1-vinyl-2,2,3,3-tetrafluorocyclobutane is added slowly to a reaction tube of the type described in the paragraph above and which is maintained at 750° C. and 4 mm. mercury pressure. After the addition is complete, about 60 minutes being required, the cold trap containing the reaction product is removed from the system and the low boiling by-products allowed to evaporate at room temperature. The remaining liquid product is neutralized with sodium bicarbonate, dried over anhydrous calcium sulfate, and filtered. Distillation of the liquid reaction product through an efficient fractionating column gives 9 parts of 3,3,4,4-tetrafluoro-1-cyclohexene boiling at 68-71° C. at approximately 90 mm. mercury pressure, and having a refractive index, $n_D^{25}$, of 1.3722. The infrared absorption spectrum of this product confirms the tetrafluorocyclohexene structure.

*Analysis.*—Calculated for $C_6H_6F_4$: F, 49.3%. Found: F, 50.4%, 50.1.

*Example II*

Four hundred parts of 1-vinyl-2,2,3,3-tetrafluorocyclobutane is passed through a reaction tube of the type used in Example I maintained at 750° C. and 2 mm. mercury pressure. After the addition is completed, about 3 hours being required, the cold trap is disconnected from the system and the reaction products are worked up as in Example I. Fractional distillation of the liquid reaction product gives 95 parts of 3,3,4,4-tetrafluoro-1-cyclohexene, B. P. 65° C./90 mm., $n_D^{25}=1.3722$, 11–12 parts 4,4,5,5-tetrafluoro-1-cyclohexene, B. P. 54° C./90 mm., $n_D^{25}=1.3700$, together with o-difluorobenzene and recovered starting material.

The 3,3,4,4-tetrafluoro-1-cyclohexene of Example II is converted to tetrafluoroadipic acid by the following procedure. Ten parts of 3,3,4,4-tetrafluoro-1-cyclohexene is placed in 120 parts of methylene chloride and the mixture is cooled to −78° C. A stream of oxygen containing 2% ozone is passed through the cold mixture at a rate of 0.1 cubic foot per minute for a period of 2 hours. The methylene chloride is then removed from the reaction product by evaporation under reduced pressure and 50 parts of glacial acetic acid is added to the residue. This acetic acid solution is dropped into a mixture consisting of 13 parts of 30% hydrogen peroxide, 1.8 parts of concentrated sulfuric acid and 50 parts of distilled water. The acid mixture is heated at reflux temperature until a clear solution is obtained. The mixture is then cooled, extracted with ether and the ether-acetic acid layer is evaporated to dryness under reduced pressure. The resulting white solid residue is dissolved in water, filtered and the water layer is then extracted with ether. The ether extract is evaporated to dryness and the resulting solid residue is dried over phosphorus pentoxide. There is obtained a nearly quantitative yield of α,α,β,β-tetrafluoroadipic acid which can be recrystallized from zylene.

*Analysis.*—Calculated for $C_6H_6F_4O_4$: C, 33.04%; H, 2.77%; F, 34.84%; N. E., 218. Found: C, 33.38%; H, 3.10%; F, 35.1%; N. E., 219.

The infrared absorption spectrum also confirms the structure of this product as tetrafluoroadipic acid.

3,3,4,4-tetrafluoro-1-cyclohexene is converted to o-difluorobenzene by the following procedure: 42.5 parts of crude 3,3,4,4-tetrafluoro-1-cyclohexene prepared as described in Example I is heated at reflux temperature for 3 hours with a mixture of 50 parts of water, 45 parts of β-butoxyethanol and 25 parts of potassium hydroxide. Distillation of the reaction product gives an azeotropic mixture, the organic phase of which has a refractive index, $n_D^{25}$, of 1.4120. This refractive index indicates that the reaction is not complete so the organic phase is again treated with a mixture of 10 g. of potassium hydroxide in 45 parts of β-butoxyethanol at reflux temperature for 2 hours. Distillation of the reaction mixture gives an azeotropic mixture of fluorohydrocarbon and water. The fluorohydrocarbon fraction is redistilled and there is obtained approximately 8 parts of o-difluorobenzene, B. P. 91–93° C., $n_D^{25}$ 1.4405. (These values correspond to the published values of B. P. 91–92° C. and $n_D^{15}$ 1.4451 for o-difluorobenzene.)

*Analysis.*—Calculated for $C_6H_4F_2$: F, 33.3%. Found: F, 33.9%.

The structure of this compound is also confirmed by its infrared absorption spectrum.

The 4,4,5,5-tetrafluoro-1-cyclohexene of Example II given an infrared absorption spectrum which is in agreement with its indicated structure.

*Analysis.*—Calculated for $C_6H_6F_4$: F, 49.32%. Found: F, 48.79%, 48.94.

*Example III*

Approximately 55 parts (50 ml.) of 1-methyl-1-isopropenyl-2,2,3,3-tetrafluorocyclobutane is passed through a reaction tube of the type described previously maintained at 650° C. and 1–3 mm. mercury pressure by the procedure of the preceding examples. After the low boiling products are allowed to evaporate from the reaction product collected in the cold trap, the liquid residue is distilled in an efficient fractionating column, and there is obtained 6 parts of 1,2-dimethyl-3,3,4,4-tetrafluoro-1-cyclohexene B. P. 42–45° C./4.5 mm. mercury, $$n_D^{25}=1.4042$$

$d^{25}=1.21$. The remainder of the distillate is principally starting material.

*Analysis.*—Calculated for $C_8H_{10}F_4$: C, 52.74%; H, 5.53%; F, 41.7%. Found: C, 52.23%; H, 5.79%; F, 41.6%.

The infrared absorption spectrum obtained for this product confirms the structure of this compound.

The 1,2-dimethyltetrafluoro-1-cyclohexene of Example III can be converted to 2,7-diketotetrafluorooctane by the following procedure. Approximately 3.5 parts of 1,2-dimethyltetrafluoro-1-cyclohexene is dissolved in 67 parts of methylene chloride and a stream of oxygen containing 2% ozone is passed through the solution at a rate of 0.1 cubic foot per minute for a period of 2 hours at a temperature of −78° C. The resulting methylene chloride solution is then added to 50 parts of a 50%, by volume, solution of glacial acetic acid in water which contains 1.25 parts of zinc dust. The mixture is heated and the methylene chloride is allowed to distill off. The acid mixture is extracted with ether and the ether extract is neutralized with sodium bicarbonate. Distillation of the ether extract gives 1.5 parts of 2,7-diketo-3,3,4,4-tetrafluorooctane, B. P. 53° C./0.4 mm. mercury $n_D^{25}=1.3826$.

*Analysis.*—Calculated for $C_8H_{10}F_4O_2$: C, 44.87%; H, 4.70%; F, 35.5%. Found: C, 44.84%; H, 4.82%; F, 36.09%; 36.13.

The infrared absorption spectrum for this product also confirms the indicated structure.

Example IV

Sixty parts of the cyclobutane obtained from tetrafluoroethylene and isoprene, 1-vinyl-1-methyl-2,2,3,3-tetrafluorocyclobutane, is pyrolyzed at 750° C. and at 4 mm. mercury pressure by the general procedure of Example I. After the low boiling by-product is allowed to evaporate from the cold trap, the remaining liquid product is washed with sodium bicarbonate and dried over anhydrous calcium chloride. The dried product is then rapidly fractionated. Infrared analysis of the last two fractions boiling at 70–77° C. and 77–82° C. at approximately 90 mm. mercury pressure indicates that two tetrafluorocyclohexenes are present. The highest boiling fraction is redistilled through an efficient fractionating column and there are obtained the following fractions:

| Fraction | B. P. at Approximately 90 mm. Hg Pressure | Refractive Index, $n_D^{25}$ | Amount, Parts by Weight |
|---|---|---|---|
| 1 | 77° C | | 0.7 |
| 2 | 78–80° C | 1.3841 | 1.5 |
| 3 | ca. 81–85° C | 1.3842 | 1.5 |
| 4 | ca. 80–85° C | 1.3842 | 4.0 |
| 5 | above 85° C | 1.3844 | 1.0 |

Fraction 3 is 2-methyl-3,3,4,4-tetrafluoro-1-cyclohexene.

*Analysis.*—Calculated for $C_7H_8F_4$: C, 50.00%; H, 4.79%; F, 45.20%. Found: C, 49.92%; H, 5.16%; F, 45.16%.

The lower boiling of the first mentioned fractions, i. e., the one boiling at 70–77° C. at 90 mm. is mainly 2-methyl-4,4,5,5-tetrafluoro-1-cyclohexene.

The 2-methyl-3,3,4,4-tetrafluoro-1-cyclohexene prepared by the method of Example IV and boiling at 80–81° C./89–92 mm. Hg is ozonized in a manner similar to that described previously. From the resulting ozonide there is obtained by treatment, as in Example II, with hydrogen peroxide, sulfuric acid and glacial acetic acid, ε-keto-γ,γ,δ,δ-tetrafluoroheptanoic acid having a boiling point of 87° C./0.2 mm. mercury and having a refractive index, $n_D^{25}$, of 1.3855.

*Analysis.*—Calculated for $C_7H_8F_4O_3$: C, 38.89%; H, 3.72%; F, 35.16%; N. E., 216. Found: C, 38.14%; H, 4.13%; F, 35.11%, 35.32; N. E., 249, 257.

Example V

Eighty-two parts of 1-vinyl-2,2-dichloro-3,3-difluorocyclobutane is pyrolyzed at 550° C. and 4 mm. in the manner previously described. The trap containing the pyrolysis product is removed from the system, the low boiling materials allowed to boil off at room temperature, and the liquid pyrolysis product is distilled. Six parts of 3,3-dichloro-4,4-difluoro-1-cyclohexene is obtained, B. P. 72° C./28 mm., $n_D^{25}$ 1.4580.

*Analysis.*—Calculated for $C_6H_6F_2Cl_2$: C, 38.53%; H, 3.23%; F, 20.37%; Cl, 37.91%. Found: C, 39.31%; H, 3.43%; F, 20.34%, 20.37; Cl, 37.91%, 37.63.

The infrared analysis of the material in consistent with the indicated structure.

Example VI

Fifty-four parts of 1-chloro-1-vinyl-2,2,3,3-tetrafluorocyclobutane is pyrolyzed at 700° C. and 4 mm. in the usual manner. Distillation of the liquid pyrolysis product gives:

| Fraction | B. P. at 90 mm. Hg Pressure | Amount, Parts by Weight | Refractive Index, $n_D^{25}$ |
|---|---|---|---|
| 1 | 42–61 | 1 | 1.3836 |
| 2 | 61–71 | 1 | 1.3963 |
| 3 | 70 | 1 | 1.4029 |
| 4 | 70 | 1 | 1.4020 |
| 5 | 70 | 1 | 1.4012 |
| 6 | 70 | 1 | 1.4005 |
| 7 | 70 | 2.3 | 1.4005 |
| 8 | 70–78 | 1 | 1.4000 |
| 9 | 85–91 | 0.5 | 1.4010 |
| 10 | 91–103 | 0.7 | 1.4030 |
| 11 | 103–105 | 1 | 1.4050 |
| 12 | Pot | 1 | 1.4100 |

*Analysis.*—Calculated for $C_6H_5F_4Cl$: C, 38.21%; H, 2.67%; F, 40.30%; Cl, 18.80%. Found (fraction 7): C, 38.80%; H, 2.76%; F, 40.28%, 39.94; Cl, 18.86%. Found (fraction 11): C, 38.24%; H, 2.88%; Cl, 18.13%.

Infrared and elemental analysis indicate that fractions 4–7 are 2-chloro-4,4,5,5-tetrafluoro-1-cyclohexene and that fraction 11 is 2-chloro-3,3,4,4-tetrafluoro-1-cyclohexene.

Example VII

Approximately 10 parts of 1-vinyl-1-cyano-2,2,3,3-tetrafluorocyclobutane is pyrolyzed at 600° C. and 2–4 mm. in the usual manner. The trap containing the pyrolysis product is removed from the system and the low boiling gases allowed to boil off. The liquid pyrolysis product is distilled.

| Fraction | B. P. at 0.2 mm. Hg Pressure | Refractive Index, $n_D^{25}$ | Amount, Parts by Weight |
|---|---|---|---|
| 1 | 30–35 | 1.3970 | 0.2 |
| 2 | 35 | 1.4050 | 0.5 |
| 3 | 35–37 | 1.4085 | 0.5 |
| 4 | 37 | 1.4085 | 0.5 |

The material in fractions 3 and 4 is 2-cyano-4,4,5,5-tetrafluoro-1-cyclohexene. Infrared and elemental analyses are consistent with the said structure.

Calculated for $C_7H_5F_4N$: C, 46.93%; H, 2.81%; F, 42.43%. Found: C, 47.11%; H, 2.94%; F, 42.22%, 42.12.

Example VIII

Fifty-six parts of 1-(α-chlorovinyl)-2,2,3,3-tetrafluorocyclobutane is pyrolyzed at 700° C. and 4 mm. in the usual manner. A portion of the lower boiling material is allowed to distill into the second trap. The higher boiling liquid in the first trap is then removed from the pyrolysis system and distilled.

| Fraction | Boiling Point | Pressure, mm. | Refractive Index, $n_D^{25}$ | Amount, Parts by Weight |
|---|---|---|---|---|
| 1 | −62 | | | 1.8 |
| 2 | 62–66 | 92 | 1.3885 | 2.4 |
| 3 | 66–67 | 92 | 1.3875 | 2.4 |
| 4 | 67 | 92 | 1.3880 | 2.4 |
| 5 | 67 | 92 | 1.3885 | 2.4 |
| 6 | 67 | 92 | 1.3885 | 2.4 |
| 7 | 67 | 92 | 1.3885 | 2.4 |
| 8 | 67 | 92 | 1.3885 | 2.4 |
| 9 | 67 | 92 | 1.3885 | 2.4 |
| 10 | 67 | 92 | 1.3885 | 2.4 |
| 11 | 67 | 92 | [1] 1.3888 | 2.4 |
| 12 | 69 | 94 | [1] 1.3888 | 2.7 |
| 13 | 69 | 94 | [1] 1.3888 | 2.4 |
| 14 | 69–72 | 95 | 1.3898 | 3.6 |
| 15 | 72–74 | 95 | 1.3928 | 1.2 |
| 16 | 74–82 | 94 | 1.3980 | 1.2 |
| 17 | 82–84 | 94 | 1.4030 | 1.2 |
| 18 | 84 | 94 | 1.4040 | 1.2 |
| 19 | 84 | 94 | 1.4040 | 0.6 |
| | 84 | 94 | 1.4045 | 1.2 |

[1] Temp.=23.5° C.

Fractions 3–12 are principally recovered starting material and fractions 17–19 are 1-chloro-3,3,4,4-tetrafluorocyclohexene. Infrared and analytical data obtained on fraction 19 are in accord with the proposed structure.

*Analysis.*—Calculated for $C_6H_5F_4Cl$: C, 38.21%; H, 2.67%; F, 40.30%. Found: C, 38.77%; H, 2.87%; F, 40.71%, 40.75.

The process and products of this invention have been illustrated above by the pyrolysis of certain vinylidenetetrafluorocyclobutanes and vinylidenechlorofluorocyclobutanes to tetrafluoro- and chlorofluorocyclohexenes. The invention however is generic to any fluorocyclohexene containing an annular $CF_2$ group adjacent to a $CX_2$ group in which the X's are the same or different and are the fluorine, chlorine or bromine, and two annular $CH_2$ groups, any substituents on the two remaining annular carbons, i. e., those bearing the double bonds, being monovalent hydrocarbon free from non-aromatic unsaturation, e. g., alkyl, aryl, cycloalkyl and the like, cyano groups or halogen atoms of atomic number not greater than 35. The products of this invention have the two following formulas:

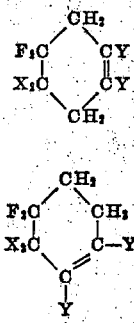

and

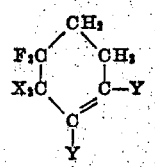

wherein the X's represent fluorine, chlorine or bromine and can be the same or different, and the Y's represent hydrogen, fluorine, chlorine, bromine, cyano groups or monovalent hydrocarbon radicals free from non-aromatic unsaturation, e. g., alkyl, aryl and cycloalkyl radicals, and they can be the same or different. Specific examples of other fluorocyclohexenes of the present invention are:

1-phenyl-3,3,4,4-tetrafluoro-1-cyclohexene
2-cyclohexyl-3,3,4,4-tetrafluoro-1-cyclohexene
1-bromo-3,3,4,4-tetrafluoro-1-cyclohexene
1,2-dichloro-4,4,5,5-tetrafluoro-1-cyclohexene
2,3,3,4,4-pentafluoro-1-cyclohexene
2-hexyl-4,4,5,5-tetrafluoro-1-cyclohexene
1,2-di-n-butyl-3,3,4,4-tetrafluoro-1-cyclohexene
2-ethyl-3,3,4,4-tetrafluoro-1-cyclohexene
2-phenyl-3,3-dichloro-4,4-difluoro-1-cyclohexene
1-cyclohexyl-3,3-dichloro-4,4-difluoro-1-cyclohexene
2,3,3-trichloro-4,4-difluoro-1-cyclohexene
1,2-dimethyl-3,3-dichloro-4,4-difluoro-1-cyclohexene
2-methyl-4,4-dichloro-5,5-difluoro-1-cyclohexene
2-cyclohexyl-4,4-dichloro-5,5-difluoro-1-cyclohexene
1,4,4-trichloro-5,5-difluoro-1-cyclohexene
2-cyano-4,4-dichloro-5,5-difluoro-1-cyclohexene
1-phenyl-3-chloro-3,4,4-trifluoro-1-cyclohexene
2-cyclohexyl-3-chloro-3,4,4-trifluoro-1-cyclohexene
2,3-dichloro-3,4,4-trifluoro-1-cyclohexene
1-methyl-4-chloro-4,5,5-trifluoro-1-cyclohexene
2-cyclohexyl-4-chloro-4,5,5-trifluoro-1-cyclohexene
2-cyano-4-chloro-4,5,5-trifluoro-1-cyclohexene
3,3-dibromo-4,4-difluoro-1-cyclohexene
3-bromo-3,4,4-trifluoro-1-cyclohexene
1-methyl-3,3-dibromo-4,4-difluoro-1-cyclohexene, and
2-naphthyl-3,3,4,4-tetrafluoro-1-cyclohexene.

With these fluorocyclohexenes, two structural isomers are possible, i. e., those with four halogen atoms in the 3,3,4,4 and those in the 4,4,5,5 positions, as indicated by the general formulas and specific compounds given above. Both types are obtainable in the process of this invention and the particular isomer predominating in any case depends on the particular substituents present as the Y's in the general formulas.

The process of this invention has been illustrated in the examples and in the products enumerated in the preceding paragraph by the pyrolysis of certain vinylidenefluorocyclobutanes. However, the process is operable with any vinylidenefluorocyclobutane of the formula

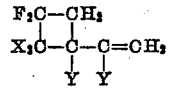

wherein the X's are the same or different, and are fluorine, chlorine or bromine, and the Y's are the same or different, and are hydrogen, a monovalent hydrocarbon radical free from non-aromatic unsaturation, e. g., alkyl, cycloalkyl or aryl, a cyano radical, fluorine, chlorine or bromine. The specific products enumerated in the preceding paragraph are obtained from the following vinylidenefluorocyclobutanes:

1-(α-phenylvinyl)-2,2,3,3-tetrafluorocyclobutane
1-cyclohexyl-1-vinyl-2,2,3,3-tetrafluorocyclobutane
1-(α-bromovinyl)-2,2,3,3-tetrafluorocyclobutane
1-chloro-1-(α-chlorovinyl)-2,2,3,3-tetrafluorocyclobutane
1-vinyl-1,2,2,3,3-pentafluorocyclobutane
1-hexyl-1-vinyl-2,2,3,3-tetrafluorocyclobutane
1-n-butyl-1-(α-n-butylvinyl)-2,2,3,3-tetrafluorocyclobutane
1-ethyl-1-vinyl-2,2,3,3-tetrafluorocyclobutane
1-phenyl-1-vinyl-2,2-dichloro-3,3-difluorocyclobutane
1-(α-cyclohexylvinyl)-2,2-dichloro-3,3-difluorocyclobutane
1-vinyl-1,2,2-trichloro-3,3-difluorocyclobutane
1-methyl-1-(α-methylvinyl)-2,2-dichloro-3,3-difluorocyclobutane
1-methyl-1-vinyl-2,2-dichloro-3,3-difluorocyclobutane
1-cyclohexyl-1-vinyl-2,2-dichloro-3,3-difluorocyclobutane
1-(α-chlorovinyl)-2,2-dichloro-3,3-difluorocyclobutane
1-cyano-1-vinyl-2,2-dichloro-3,3-difluorocyclobutane
1-(α-phenylvinyl)-2-chloro-2,3,3-trifluorocyclobutane
1-cyclohexyl-1-vinyl-2-chloro-2,3,3-trifluorocyclobutane
1,2-dichloro-1-vinyl-2,3,3-trifluorocyclobutane
1-(α-methylvinyl)-2-chloro-2,3,3-trifluorocyclobutane
1-cyclohexyl-1-vinyl-2-chloro-2,3,3-trifluorocyclobutane
1-cyano-1-vinyl-2-chloro-2,3,3-trifluorocyclobutane
1-vinyl-2,2-dibromo-3,3-difluorocyclobutane
1-vinyl-2-bromo-2,3,3-trifluorocyclobutane
1-(α-methylvinyl)-2,2-dibromo-3,3-difluorocyclobutane
1-naphthyl-1-vinyl-2,2,3,3-tetrafluorocyclobutane.

When the Y's in the general formula of the starting materials are hydrocarbon radicals, it is preferred that they contain from 1 to 6 carbon atoms.

The rearrangement of vinylidenefluorocyclobutanes of the general formula given above to fluorocyclohexenes at elevated temperatures is unique and unexpected in view of the course of the reaction taken when tetrafluorocyclobutanes not possessing a vinylidene group attached to annular carbon are pyrolyzed under the same conditions. Instead of forming six-membered ring compounds, tetrafluorocyclobutanes having no vinylidene group attached to annular carbon cleave into two monoolefinic fragments as described in the Anderson U. S. Patent 2,733,278, issued January 31, 1956, and the Anderson U. S. Patent 2,773,089, issued December 4, 1956.

The products of this invention contain a high proportion of halogen and at least two fluorine atoms, which makes them useful as solvents. For example, 3,3,4,4-tetrafluoro-1-cyclohexene is a good solvent for the solid highly fluorinated alcohols having 13 to 17 carbon atoms obtained by the telomerization of tetrafluoroethylene with methanol as described in U. S. 2,559,628 to R. M. Joyce.

In view of the wide variety of chemical reactions which they undergo, the products of this invention are especially useful as chemical intermediates in the formation of tetrahaloadipic acids, o-di-fluorobenzenes, and tetrafluorocyclohexanes.

For example, ozonolysis of the fluorocyclohexenes yields dibasic acids, keto acids or diketones, depending on the particular substituents on the doubly bonded carbons in the cyclohexene nucleus. They can also be dehydrohalogenated, and the olefinic double bond can be hydrogenated to form saturated cyclohexane structures.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A fluorocyclohexene containing two adjacent annular $CF_2$ groups, two annular $CH_2$ groups, and a pair of annular carbon atoms doubly bonded to each other, the respective extra-nuclear valences of the carbon atoms doubly bonded to each other being satisfied by at least one member of the class consisting of hydrogen, halogen of atomic number not greater than 35, cyano, and monovalent saturated hydrocarbon radicals of no more than six carbon atoms.

2. 3,3,4,4-tetrafluoro-1-cyclohexene.
3. 2-cyano-4,4,5,5-tetrafluoro-1-cyclohexene.
4. 2-methyl-3,3,4,4-tetrafluoro-1-cyclohexene.
5. 2-methyl-4,4,5,5-tetrafluoro-1-cyclohexene.
6. 4,4,5,5-tetrafluoro-1-cyclohexene.
7. The process for preparing fluorine containing cyclohexenes which comprises exposing, to a temperature within the range 450–800° C. a vinylidenefluorocyclobutane of the formula

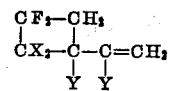

wherein each X is a halogen of atomic number not greater than 35 and each Y is a member of the class consisting of hydrogen, fluorine, chlorine, bromine, cyano, and monovalent hydrocarbon radicals free from non-aromatic unsaturation and recovering the fluorocyclohexene.

References Cited in the file of this patent

Ellis et al.: "Chemical Society Journal," 1950, pp. 3608–3612.